(12) United States Patent
Park (10) Patent No.: US 11,749,853 B2
(45) Date of Patent: Sep. 5, 2023

(54) BATTERY MODULE

(71) Applicant: Samsung SDI Co., Ltd., Yongin-si (KR)

(72) Inventor: Juyong Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 105 days.

(21) Appl. No.: 16/341,004

(22) PCT Filed: Sep. 14, 2017

(86) PCT No.: PCT/KR2017/010101
§ 371 (c)(1),
(2) Date: Apr. 10, 2019

(87) PCT Pub. No.: WO2018/070675
PCT Pub. Date: Apr. 19, 2018

(65) Prior Publication Data
US 2019/0319318 A1    Oct. 17, 2019

(30) Foreign Application Priority Data
Oct. 13, 2016    (KR) .................... 10-2016-0132847

(51) Int. Cl.
*H01M 10/6552*    (2014.01)
*H01M 10/613*    (2014.01)
(Continued)

(52) U.S. Cl.
CPC ..... *H01M 10/6552* (2015.04); *H01M 10/613* (2015.04); *H01M 10/6554* (2015.04); *H01M 10/6556* (2015.04); *H01M 50/271* (2021.01)

(58) Field of Classification Search
CPC ......... H01M 10/6556; H01M 10/6557; H01M 10/625; H01M 10/6552; H01M 10/613;
(Continued)

(56) References Cited

U.S. PATENT DOCUMENTS 8,974,934 B2    3/2015   Merriman et al.
9,159,973 B2    10/2015  Harada et al.
(Continued)

FOREIGN PATENT DOCUMENTS

CN    1410695 A    4/2003
CN    102563248 A   7/2012
(Continued)

OTHER PUBLICATIONS

Choi et al; "Battery cell of heat sink unit", Google Patents Machine Translation (Year: 2013).*
(Continued)

*Primary Examiner* — Dustin Q Dam
*Assistant Examiner* — Charlene Bermudez
(74) *Attorney, Agent, or Firm* — Lewis Roca Rothgerber Christie LLP (57) ABSTRACT

Provided is a battery module. The battery module includes: a first cooling pipe; a second cooling pipe connected to the first cooling pipe and arranged on a different plane than the first cooling pipe; and a branch unit connecting the first cooling pipe and second cooling pipe, wherein the branch unit includes: a lower connection pipe connected to the first cooling pipe; an upper connection pipe connected to the second cooling pipe; and a connection member into which one of the lower connection pipe and the upper connection pipe is inserted and which is inserted into the other one of the lower connection pipe and the upper connection pipe.

2 Claims, 9 Drawing Sheets (51) Int. Cl.
  *H01M 10/6554* (2014.01)
  *H01M 10/6556* (2014.01)
  *H01M 50/271* (2021.01)

(58) Field of Classification Search
  CPC .. H01M 10/617; H01M 50/204; H01M 50/26; H01M 10/6565; H01M 10/6568; H01M 2220/20; H01M 10/623; H01M 10/627; F16L 37/00; F16L 21/005; F16L 37/0926; F16L 19/0212; F16L 19/025; F16L 47/041
  See application file for complete search history.

(56) References Cited

U.S. PATENT DOCUMENTS

| | | | |
|---|---|---|---|
| 9,676,291 | B2 | 6/2017 | Haussmann |
| 10,026,937 | B2 | 7/2018 | Kim et al. |
| 10,096,869 | B2 | 10/2018 | Zheng et al. |
| 10,411,316 | B2 | 9/2019 | Hayashi et al. |
| 2003/0057701 | A1* | 3/2003 | Koo .............. F16L 37/0915 285/307 |
| 2012/0146329 | A1 | 6/2012 | McAven |
| 2012/0175873 | A1 | 7/2012 | Kim |
| 2014/0162107 | A1* | 6/2014 | Obrist ............ H01M 10/6556 429/120 |
| 2016/0036102 | A1* | 2/2016 | Suzuki ............ H01M 10/625 429/120 |
| 2016/0258561 | A1* | 9/2016 | Hiroi ................ F16L 39/00 |
| 2016/0273688 | A1* | 9/2016 | Considine, Jr. ........ F16L 37/14 |
| 2018/0241102 | A1* | 8/2018 | Kim ................. H01M 2/10 |
| 2019/0237828 | A1* | 8/2019 | Park ............... H01M 10/613 |
| 2019/0319318 | A1 | 10/2019 | Park |

FOREIGN PATENT DOCUMENTS

| | | | | |
|---|---|---|---|---|
| CN | 102589056 | A | 7/2012 | |
| CN | 204312910 | U | 5/2015 | |
| CN | 104756279 | A | 7/2015 | |
| CN | 105299347 | A | 2/2016 | |
| CN | 105359330 | A | 2/2016 | |
| CN | 205402044 | U | 7/2016 | |
| CN | 106299541 | A * | 1/2017 | ........ H01M 10/613 |
| CN | 109804498 | A | 5/2019 | |
| DE | 102014200174 | A1 * | 7/2015 | ........ H01M 10/613 |
| EP | 2 602 859 | A1 | 6/2013 | |
| EP | 2610947 | A2 | 7/2013 | |
| JP | 2001-295968 | A | 10/2001 | |
| JP | 2007-192270 | A | 8/2007 | |
| JP | 2015-96416 | A | 5/2015 | |
| JP | 2016-132314 | A | 7/2016 | |
| KR | 20-0420773 | Y1 | 7/2006 | |
| KR | 10-0785430 | B1 | 12/2007 | |
| KR | 20-0438887 | Y1 | 3/2008 | |
| KR | 10-2012-0062207 | A | 6/2012 | |
| KR | 10-2012-0096133 | A | 8/2012 | |
| KR | 10-1195425 | B1 | 10/2012 | |
| KR | 10-2013-0064969 | A | 6/2013 | |
| KR | 20130064969 | A * | 6/2013 | |
| KR | 10-2013-0113740 | A | 10/2013 | |
| KR | 2015-0043337 | A | 4/2015 | |
| KR | 10-2015-0050449 | A | 5/2015 | |
| KR | 2015-0072991 | A | 6/2015 | |
| KR | 10-1568793 | B1 | 11/2015 | |
| KR | 1568793 | B1 * | 11/2015 | |
| KR | 101568793 | B1 * | 11/2015 | |
| KR | 10-2016-0027373 | A | 3/2016 | |
| WO | 2012/117697 | A1 | 9/2012 | |

OTHER PUBLICATIONS

De Jesus; "Connecting Srtucture of Pipes", Google Patents Machine Translation (Year: 2015).*
Choi et al; "Battery cell of heat sink unit"; Machine Translation of KR 2013/0064969 A obtained from Google Patents (Year: 2013).*
De Jesus et al; "Connecting Srtucture Of Pipes"; Machine Translation of KR 101568793 B1 obtained from Google Patents (Year : 2015).*
Sun et al; "CN106299541A Power battery pack liquid cooling system"; Machine translation of CN 106299541 A obtained from Espacenet (Year: 2017).*
D Jes et al; "KR1015687930000—Pipe Connectingstructure"; Machine translation of KR 101568793 B1 obtained from WIPO IP Portal (Year: 2015).*
Koller et al; "Description DE102014200174A1"; Machine translation of DE-102014200174-A1 by Espacenet Patent Translate (Year: 2014).*
EPO Extended Search Report dated Apr. 30, 2020, for corresponding European Patent Application No. 17859628.4 (9 pages).
Written Opinion for corresponding International Application No. PCT/KR2017/010101, dated Dec. 22, 2017, 5pp.
International Search Report for corresponding International Application No. PCT/KR2017/010101, dated Dec. 22, 2017, 5pp.
Written Opinion for corresponding International Application No. PCT/KR2017/003999, dated Jul. 17, 2017, 4 pages.
International Search Report for corresponding International Application No. PCT/KR2017/003999 dated Jul. 17, 2017, 3 pages.
Office action issued in European Patent Application No. 17859628.4, dated Jan. 28, 2021, 5 pages.
Office action issued in Korean Patent Application No. 2016-132847, dated Jan. 27, 2021, 4 pages.
U.S. Notice of Allowance dated Apr. 7, 2021, issued in U.S. Appl. No. 16/342,167 (7 pages).
U.S. Notice of Allowance from U.S. Appl. No. 16/342,167, dated Sep. 18, 2020, 8 pages.
U.S. Office Action from U.S. Appl. No. 16/342,167, dated Mar. 17, 2022, 9 pages.
Korean Office Action dated Jan. 20, 2021, issued in Korean Patent Application No. 10-2016-0134551 (41 pages).
Chinese Office Action, with English translation, dated Jul. 6, 2021, issued in Chinese Patent Application No. 201780063713.4 (20 pages).
Chinese Office Action, with English translation, dated Jul. 15, 2021, issued in corresponding Chinese Patent Application No. 201780062146.0 (24 pages).
Korean Notice of Allowance dated Jul. 20, 2021, issued in Korean Patent Application No. 10-2016-0134551 (2 pages).
Korean Notice of Allowance dated Jul. 22, 2021, issued in corresponding Korean Patent Application No. 10-2016-0132847 (2 pages).
U.S. Final Office Action dated Aug. 30, 2022, issued in U.S. Appl. No. 16/342,167 (7 pages).
U.S. Notice of Allowance dated Nov. 15, 2022, issued in U.S. Appl. No. 16/342,167 (7 pages).

* cited by examiner

BATTERY MODULE

CROSS-REFERENCE TO RELATED APPLICATION(S)

This application is a National Phase Patent Application of International Patent Application Number PCT/KR2017/010101, filed on Sep. 14, 2017, which claims priority of Korean Patent Application No. 10-2016-0132847, filed Oct. 13, 2016. The entire contents of both of which are incorporated herein by reference.

TECHNICAL FIELD

The present disclosure relates to apparatuses, and more particularly, to battery modules.

BACKGROUND ART

In general, secondary batteries are rechargeable, unlike primary batteries. Secondary batteries may be used as energy sources for mobile devices, electric vehicles, hybrid vehicles, electric bicycles, uninterruptible power supplies, or the like. Depending on the types of external devices to which they are applied, the secondary batteries may be used in the form of a single battery or in the form of a battery module in which a plurality of batteries are connected and combined into one unit.

DESCRIPTION OF EMBODIMENTS

Technical Problem

A small mobile device such as a mobile phone may operate for a certain time according to the output and capacity of a single battery. However, in the case of long-time driving or high-power driving such as in the case of an electric vehicle or a hybrid vehicle with high power consumption, a battery module including a plurality of batteries may be preferred due to output and capacity issues. The battery module may increase the output voltage or the output current according to the number of built-in batteries.

Solution to Problem

Embodiments of the present disclosure provide battery modules.

According to an aspect of the present disclosure, a battery module includes: a first cooling pipe; a second cooling pipe connected to the first cooling pipe and arranged on a different plane than the first cooling pipe; and a branch unit connecting the first cooling pipe and second cooling pipe, wherein the branch unit includes: a lower connection pipe connected to the first cooling pipe; an upper connection pipe connected to the second cooling pipe; and a connection member into which one of the lower connection pipe and the upper connection pipe is inserted and which is inserted into the other one of the lower connection pipe and the upper connection pipe, wherein a lower connection unit of the lower connection pipe connected to the upper connection pipe and an upper connection unit of the upper connection pipe connected to the lower connection pipe are formed to be inclined.

Advantageous Effects of Disclosure

According to embodiments of the present disclosure, the cooling pipes arranged on different planes may be connected through the connection member through a simple structure. Also, according to the embodiments of the present disclosure, since the cooling pipes arranged on different planes are connected and sealed through the connection member, the failure and damage of the battery module due to water leakage may be prevented and the life of the battery module may be increased.

BEST MODE

According to an aspect of the present disclosure, a battery module includes: a first cooling pipe; a second cooling pipe connected to the first cooling pipe and arranged on a different plane than the first cooling pipe; and a branch unit connecting the first cooling pipe and second cooling pipe, wherein the branch unit includes: a lower connection pipe connected to the first cooling pipe; an upper connection pipe connected to the second cooling pipe; and a connection member into which one of the lower connection pipe and the upper connection pipe is inserted and which is inserted into the other one of the lower connection pipe and the upper connection pipe, wherein a lower connection unit of the lower connection pipe connected to the upper connection pipe and an upper connection unit of the upper connection pipe connected to the lower connection pipe are formed to be inclined.

Also, the lower connection unit may be inclined to be away from an outer surface of the lower connection pipe away from the first cooling pipe, and the upper connection unit may be inclined to correspond to the lower connection unit.

Also, one of the lower connection unit and the upper connection unit may be arranged inside the other one of the lower connection unit and the lower connection unit.

Also, the upper connection unit may be forcibly fitted into the connection member.

Also, the connection member may include: a sealing unit arranged between the lower connection unit and the upper connection unit; and a body unit extending from the sealing unit and inserted into one of the lower connection pipe and the upper connection pipe.

Also, the connection member may include: a core member; and a shell member arranged to cover an outer surface of the core member.

Also, the core member and the shell member may be different in hardness from each other.

Also, the lower connection unit may be bent to extend from the lower connection pipe, and the upper connection unit may be bent from an outer surface of the upper connection pipe toward the second cooling pipe.

Also, the battery module may further include a lower branch block arranged between the first cooling pipe and the lower connection pipe.

Also, the battery module may further include an upper branch block arranged between the second cooling pipe and the upper connection pipe.

Also, the battery module may further include a first cooling plate where the first cooling pipe is arranged.

Also, the battery module may further include a second cooling plate where the second cooling pipe is arranged.

According to another aspect of the present disclosure, a battery module includes: a first cooling pipe; a second cooling pipe connected to the first cooling pipe and arranged on a different plane than the first cooling pipe; a third cooling pipe connected to the first cooling pipe and arranged on a different plane than the first cooling pipe; and a branch unit connected at least one of between the first cooling pipe and the second cooling pipe and between the first cooling pipe and the third cooling pipe, wherein the branch unit includes: a lower connection pipe connected to the first cooling pipe; an upper connection pipe connected to the second cooling pipe or the third cooling pipe; and a connection member into which one of the lower connection pipe and the upper connection pipe is inserted and which is inserted into the other one of the lower connection pipe and the upper connection pipe, wherein a lower connection unit of the lower connection pipe connected to the upper connection pipe and an upper connection unit of the upper connection pipe connected to the lower connection pipe are formed to be inclined.

Also, the battery module may further include a third cooling plate where the third cooling pipe is arranged.

Mode of Disclosure

The present disclosure will be clearly understood with reference to embodiments described in detail in conjunction with the accompanying drawings. The present disclosure may, however, be embodied in many different forms and should not be construed as being limited to the embodiments set forth herein; rather, these embodiments are provided so that the present disclosure will be thorough and complete and will fully convey the scope of the present disclosure to those of ordinary skill in the art. The scope of the present disclosure will be defined by the appended claims. The terms used herein are to describe the embodiments and are not intended to limit the scope of the present disclosure. As used herein, the singular forms "a", "an", and "the" are intended to include the plural forms as well, unless the context clearly indicates otherwise. It will be understood that the terms such as "comprise", "include", and "have" used herein specify the presence of stated steps, operations, components, and/or elements but do not preclude the presence or addition of one or more other steps, operations, components, and/or elements. Although terms such as "first" and "second" may be used herein to describe various elements or components, these elements or components should not be limited by these terms. These terms are only used to distinguish one element or component from another element or component.

Figure 1:
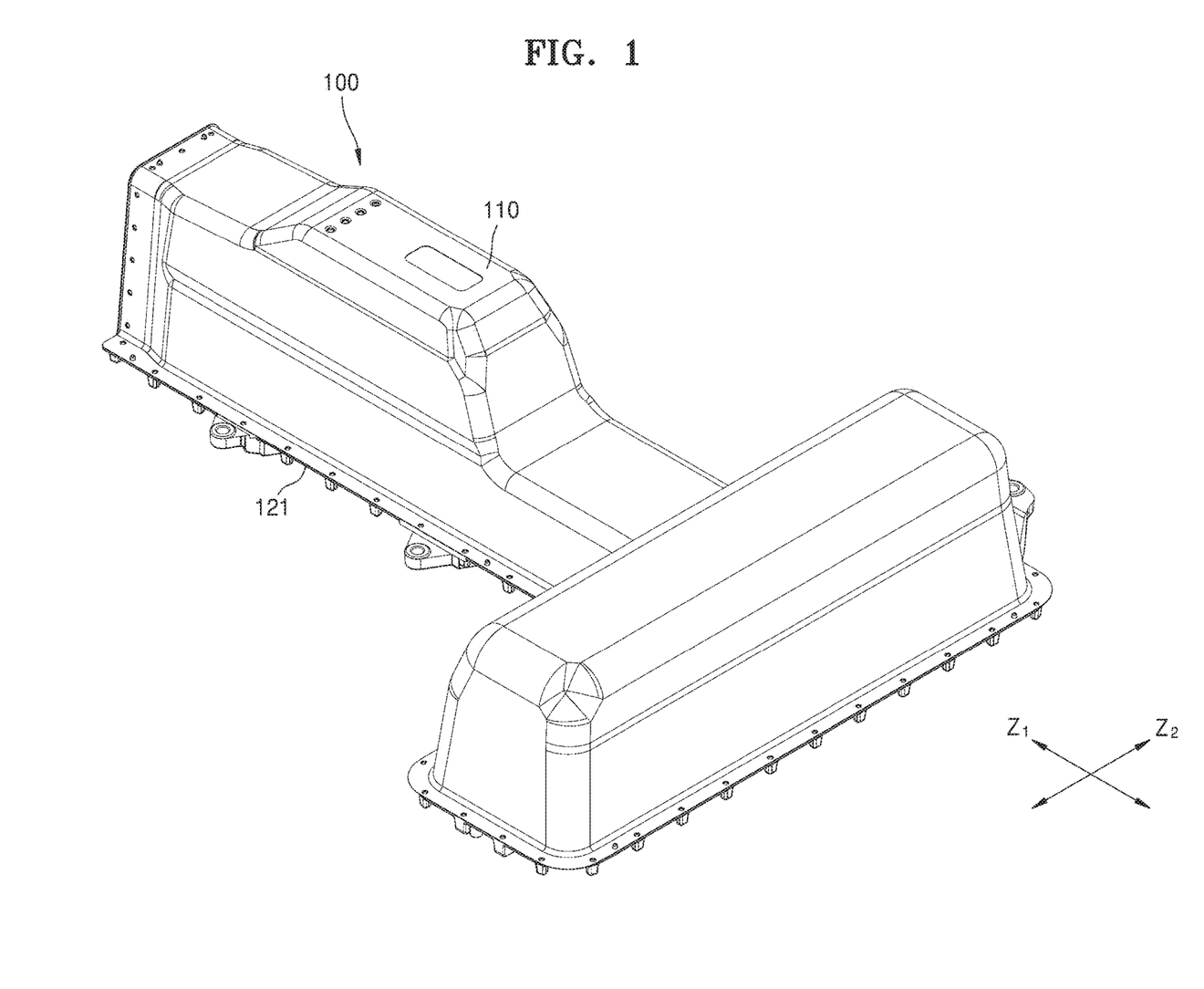
FIG. 1 is a perspective view illustrating a battery module according to an embodiment of the present disclosure.

FIG. 1 is a perspective view illustrating a battery module according to an embodiment of the present disclosure.

Referring to FIG. 1, a battery module 100 may include a first cooling plate 121 arranged at the bottom of the battery module 100 and a plurality of battery packs arranged on the first cooling plate 121 and may include a cover 110 assembled to face the first cooling plate 121 to form an accommodation space of the battery packs and to protect the battery packs from the external environment thereof. The first cooling plate 121 and the cover 110 may be formed in the same shape, for example, in a T shape extending in a first direction Z1 and a second direction Z2 different from each other, so as to be assembled to face each other.

Figure 2:
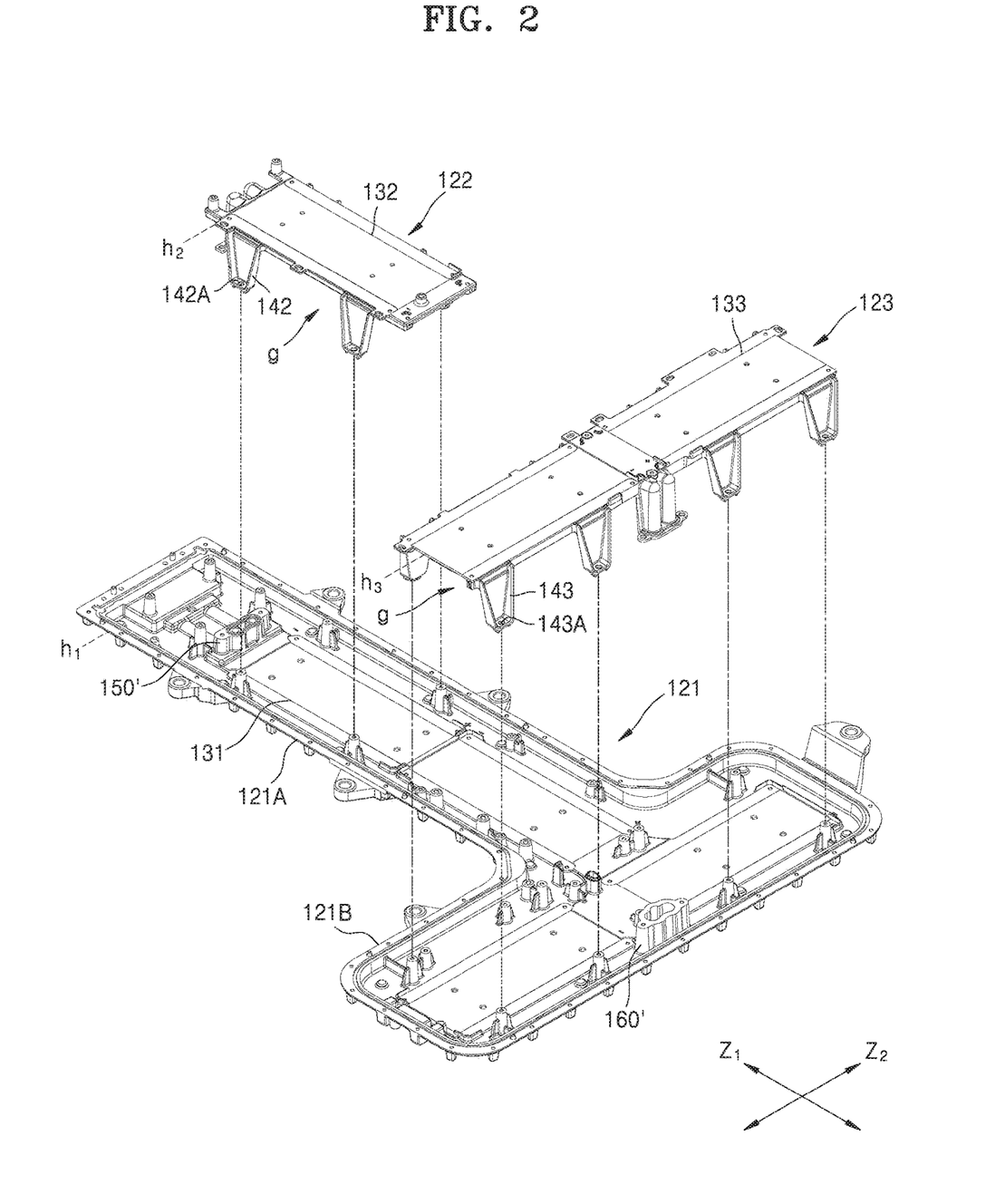
FIG. 2 is an exploded perspective view illustrating an internal structure of the battery module illustrated in FIG. 1.
Figure 3:
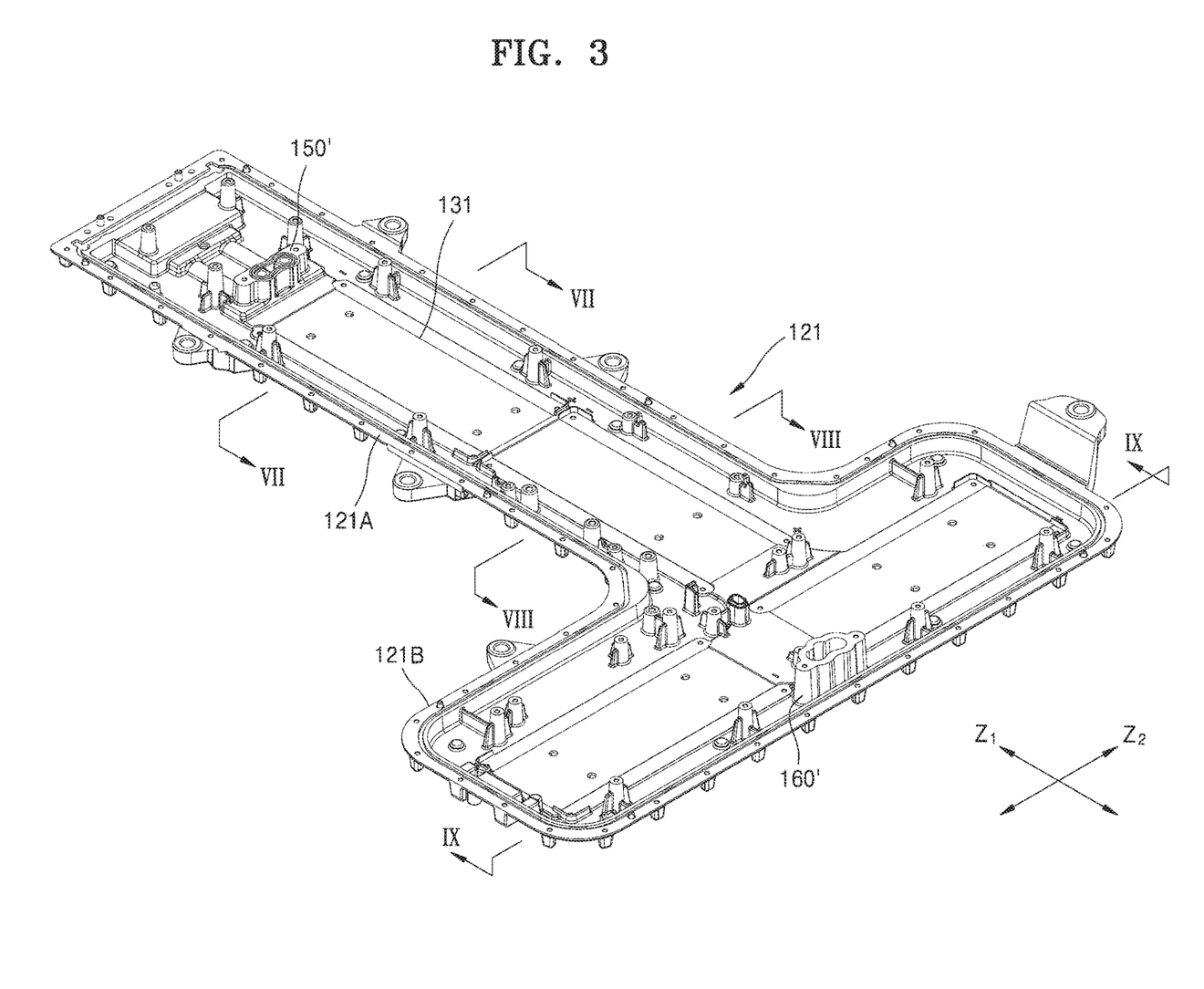
FIG. 3 is a perspective view illustrating a first cooling plate illustrated in FIG. 2.
Figure 4:
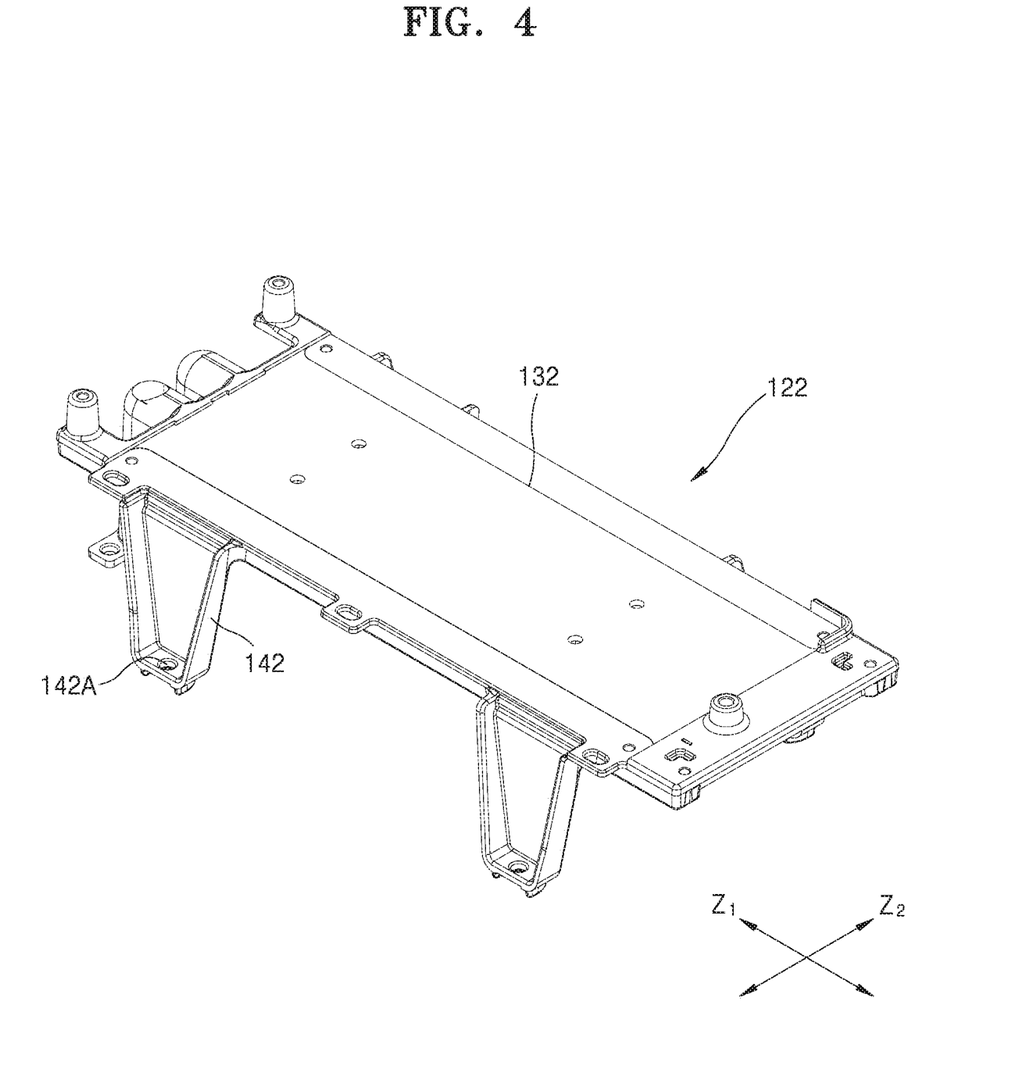
FIG. 4 is a perspective view illustrating a second cooling plate illustrated in FIG. 2.
Figure 5:
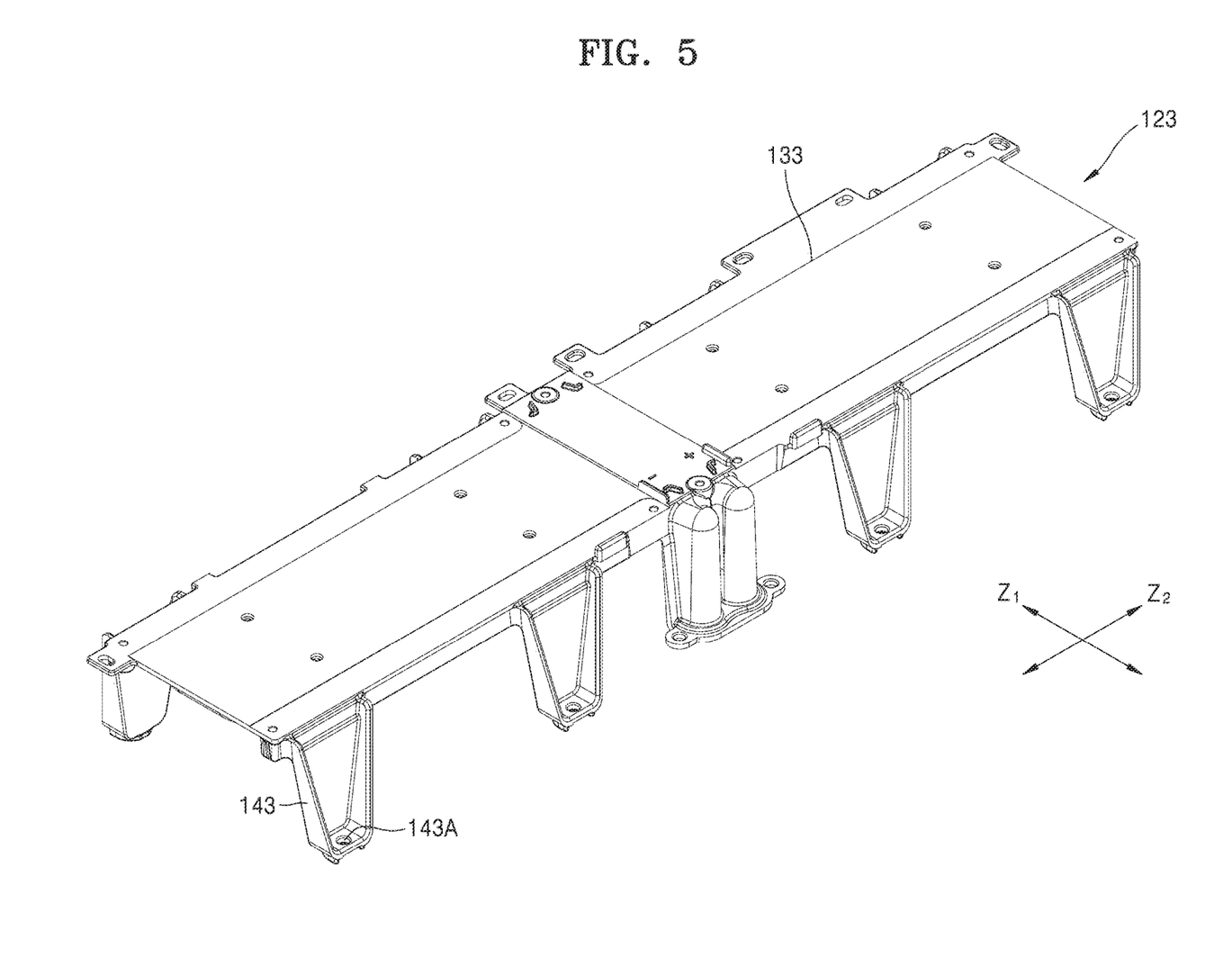
FIG. 5 is a perspective view illustrating a third cooling plate illustrated in FIG. 2.

FIG. 2 is an exploded perspective view illustrating an internal structure of the battery module illustrated in FIG. 1. FIGS. 3 to 5 are perspective views of first to third cooling plates illustrated in FIG. 2.

Referring to FIGS. 2 to 5, over the first cooling plate 121, a second cooling plate 122 may be arranged to be spaced apart from the first cooling plate 121 with a pack accommodation region G therebetween and a third cooling plate 123 may be arranged to be spaced apart from the first cooling plate 121 with a pack accommodation region G therebetween.

The first to third cooling plates 121, 122, and 123 may respectively include battery pack seating units 131, 132, and 132 that directly contact battery packs (not illustrated) to seat the battery packs. The first to third cooling plates 121, 122, and 123 may dissipate the heat of the battery packs and may dissipate the heat of the battery packs while supporting the battery packs. For example, the first cooling plate 121 may be arranged at a first level h1 corresponding to the bottom of the battery module to support a first group of battery packs (not illustrated) and dissipate the heat thereof. Also, the second cooling plate 122 may be arranged at a second level h2 upwardly spaced apart from the first level h1 to support a second group of battery packs (not illustrated) and dissipate the heat thereof. Also, the third cooling plate 123 may be arranged at a third level h3 upwardly spaced apart from the first level h1 to support a third group of battery packs (not illustrated) and dissipate the heat thereof.

The first to third groups of battery packs may include at least one or more battery packs and may include different numbers of battery packs. In an embodiment of the present disclosure, the first group of battery packs may be arranged at the first level h1 corresponding to the bottom of the battery module and may include the greatest number of battery packs, and the second group of battery packs may include the smallest number of battery packs. Also, the third group of battery packs may include fewer battery packs than the first group of battery packs and may include more battery packs than the second group of battery packs.

In an embodiment of the present disclosure, the first group of battery packs arranged on the first cooling plate 121 may include four battery packs. As will be described below, the first cooling plate 121 may include a longitudinal unit 121A extending long (elongating) in the first direction Z1 and a lateral unit 121B extending long in the second direction Z2, wherein two battery packs may be arranged on the longitudinal unit 121A in the first direction Z1 and two battery packs may be arranged on the lateral unit 121B in the second direction Z2. Also, the second group of battery packs arranged on the second cooling plate 122 may include two battery packs. The second cooling plate 122 may extend long in the first direction Z1 and two battery packs may be arranged on the second cooling plate 122 in the first direction Z1. Also, the third group of battery packs arranged on the third cooling plate 123 may include two battery packs. The third cooling plate 123 may extend long in the second direction Z2 and two battery packs may be arranged on the third cooling plate 123 in the second direction Z2.

The first cooling plate 121 may include a longitudinal unit 121A extending long in the first direction Z1 and a lateral unit 121B extending long in the second direction Z2 different from the first direction Z1. For example, the longitudinal unit 121A and the lateral unit 121B may extend long in the first and second directions Z1 and Z2 perpendicular to each other. Accordingly, the first cooling plate 121 may have a T shape as a whole.

The second cooling plate 122 may be formed over the longitudinal unit 121A of the first cooling plate 121 to be spaced apart therefrom with the pack accommodation region G therebetween. In this case, the longitudinal unit 121A of the first cooling plate 121 and the second cooling plate 122 may be formed in parallel to each other in the first direction Z1. The third cooling plate 123 may be formed over the lateral unit 121B of the first cooling plate 121 to be spaced apart therefrom with the pack accommodation region G therebetween. In this case, the lateral unit 121B of the first cooling plate 121 and the third cooling plate 123 may be formed in parallel to each other in the second direction Z2. In this case, the second cooling plate 122 and the third cooling plate 123 may be arranged to be spaced apart from each other.

The first cooling plate 121 may form the bottom of the entire battery module and may provide the base of the entire battery module. That is, the second and third cooling plates 122 and 123 may be supported over the first cooling plate 121. For this, the second and third cooling plates 122 and 123 may include legs 142 and 143 formed to support the second and third cooling plates 122 and 123 at upper positions from the first cooling plate 121. That is, the legs 142 and 143 may be respectively formed between the first and second cooling plates 121 and 122 and between the first and third cooling plates 121 and 123 to support the second and third cooling plates 122 and 123 from the first cooling plate 121 with the pack accommodation regions G therebetween. Coupling holes 142A and 143A may be formed at the legs 142 and 143 protruding from the second and third cooling plates 122 and 123, and the second and third cooling plates 122 and 123 may be fixed through fastening members (not illustrated) fastened to the first cooling plate 121 through the coupling holes 142A and 143A.

The cover 110 (see FIG. 1) may cover over the first cooling plate 121 to which the second and third cooling plates 122 and 123 are fixed. The cover 110 may seal the first to third groups of battery packs arranged on the first to third cooling plates 121, 122, and 123 to protect them from the external environment thereof. That is, the first cooling plate 121 and the cover 110 may be assembled to face each other to form an accommodation space in which the first to third groups of battery packs are accommodated. The first cooling plate 121 and the cover 110 may be formed in the same shape, for example, in a T shape, so as to be assembled to face each other.

Figure 6:
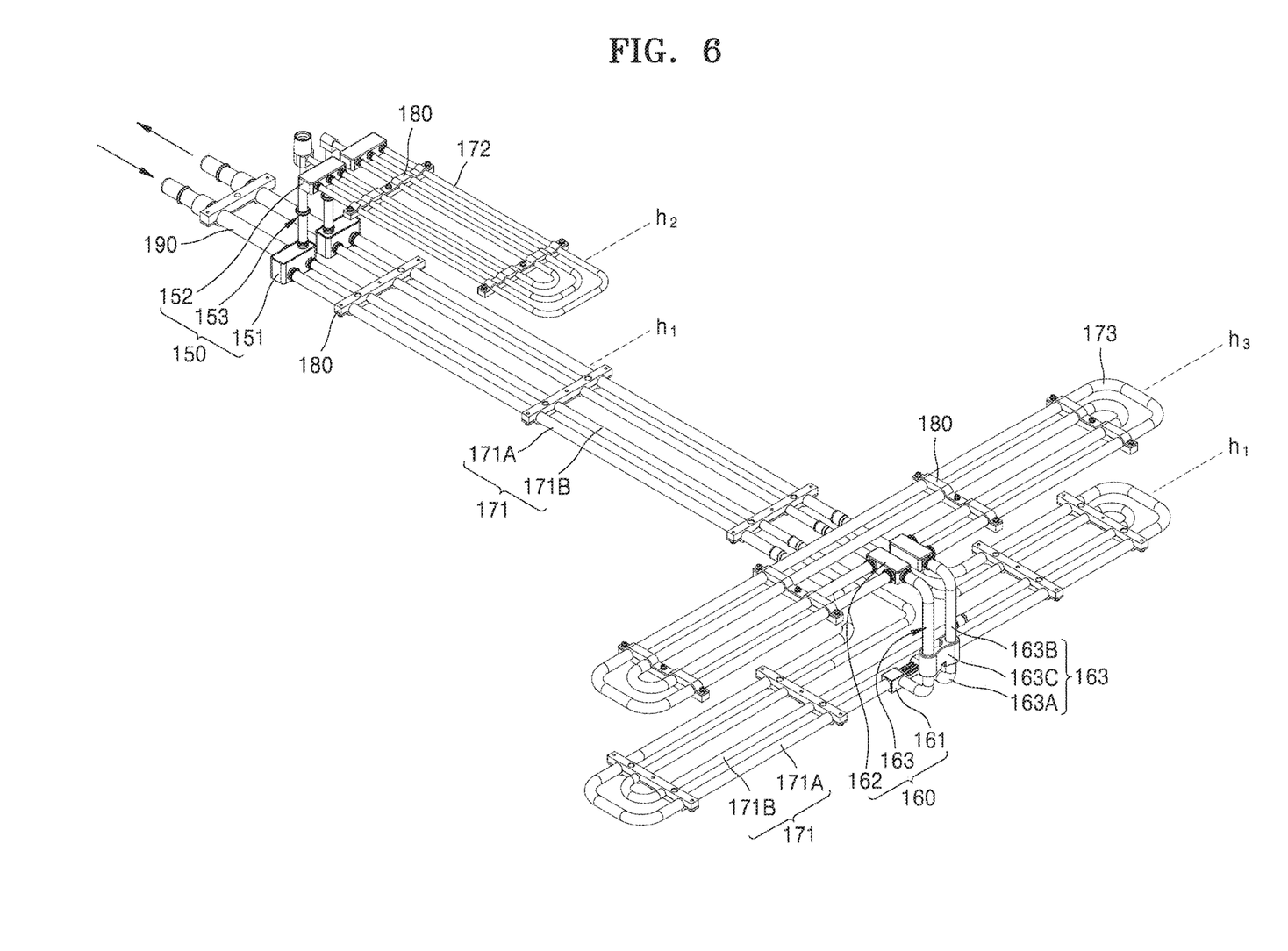
FIG. 6 is a perspective view illustrating first to third cooling pipes embedded in the first to third cooling plates illustrated in FIG. 2.
Figure 7:
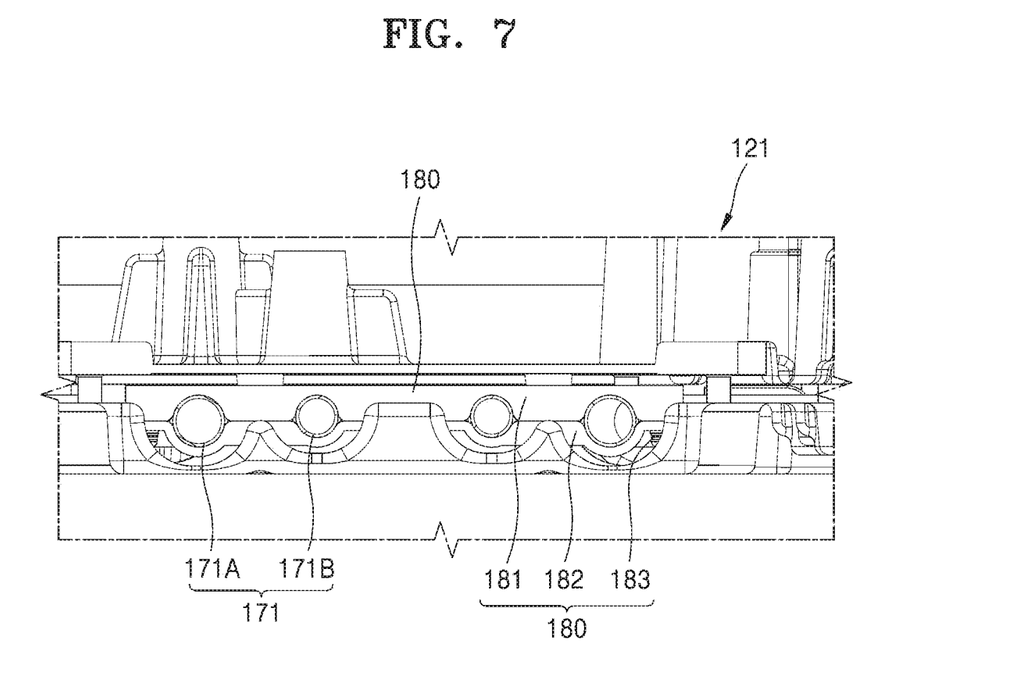
FIG. 7 is a cross-sectional view taken along a line VII-VII of FIG. 3.
Figure 8:
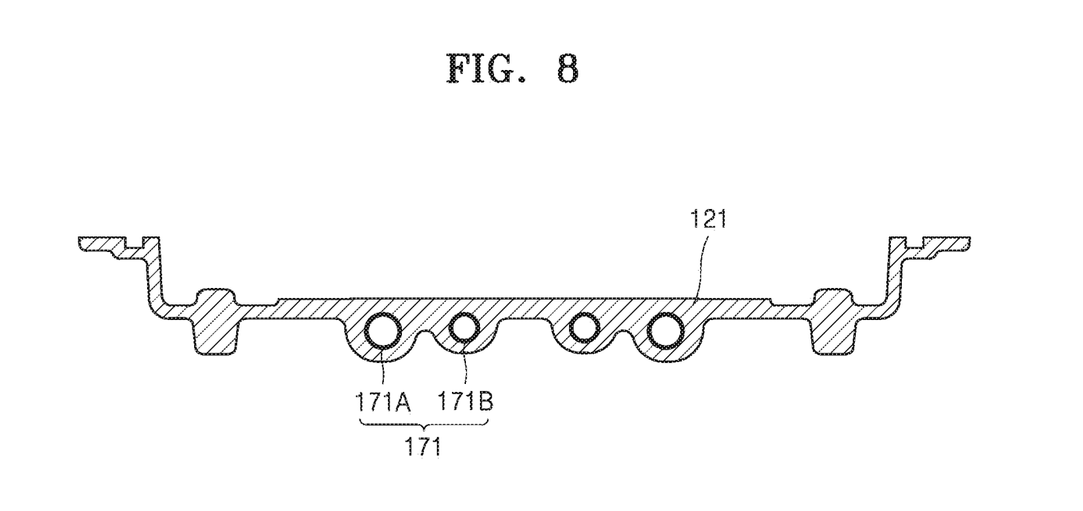
FIG. 8 is a cross-sectional view taken along a line VIII-VIII of FIG. 3.

FIG. 6 is a perspective view illustrating first to third cooling pipes embedded in the first to third cooling plates illustrated in FIG. 2. FIG. 7 is a cross-sectional view taken along a line VII-VII of FIG. 3. FIG. 8 is a cross-sectional view taken along a line VIII-VIII of FIG. 3.

Referring to FIGS. 6 to 8, the first to third cooling plates 121, 122, and 123 may support battery packs (not illustrated) and thermally contact the battery packs, for example, directly contact the battery pack seating units 131, 132, and 133, to dissipate the heat of the battery packs. Also, for this, first to third cooling pipes 171, 172, and 173 may be arranged in the first to third cooling plates 121, 122, and 123. For example, the first to third cooling pipes 171, 172, and 173 may be embedded in the first to third cooling plates 121, 122, and 123. Here, the first to third cooling pipes 171, 172, and 173 may be integrally formed with the first to third cooling plates 121, 122, and 123 while being embedded in the first to third cooling plates 121, 122, and 123.

The first to third cooling pipes 171, 172, and 173 may be formed of different heterogeneous metal materials than the first to third cooling plates 121, 122, and 123 and may be formed through die casting. For example, the first to third cooling plates 121, 122, and 123 may be formed by injecting a molten metal for plate formation into a mold (not illustrated) where the first to third cooling pipes 171, 172, and 173 are temporarily fixed. In this way, the first to third cooling plates 121, 122, and 123 in which the first to third cooling pipes 171, 172, and 173 are integrally embedded may be obtained. For example, the first to third cooling pipes 171, 172, and 173 and the first to third cooling plates 121, 122, and 123 may be formed of different heterogeneous metal materials, wherein the first to third cooling pipes 171, 172, and 173 may be formed of a SUS (stainless steel) material having a relatively high melting point and the first to third cooling plates 121, 122, and 123 may be formed of an aluminum material having a relatively low melting point. For example, molten aluminum may be injected in a state where the first to third cooling pipes 171, 172, 173 of a SUS material are temporarily fixed in a mold (not illustrated), and the first to third cooling pipes 171, 172, and 173 may maintain a pipe shape while maintaining a solid state according to the difference in melting point. The first to third cooling pipes 171, 172, and 173 and the first to third cooling plates 121, 122, and 123 embedding the first to third cooling pipes 171, 172, and 173 may be formed of a SUS material and an aluminum material having excellent heat conduction characteristics and different melting points to smoothly dissipate the heat of the battery packs that thermally contact them.

As described above, the first cooling pipe 171 may be embedded in the first cooling plate 121, and the second cooling pipe 172 may be embedded in the second cooling plate 122. Also, the third cooling pipe 173 may be embedded in the third cooling plate 123. Thus, the first cooling pipe 171 may be arranged at the same level as the first cooling plate 121, that is, at the first level h1 corresponding to the bottom of the entire battery module, and the second cooling pipe 172 may be arranged at the same level as the second cooling plate 122, that is, at the second level h2 higher than the bottom level of the entire battery module. Also, the third cooling pipe 173 may be arranged at the same level as the third cooling plate 123, that is, at the third level h3 higher than the bottom level of the entire battery module. In this case, the second level h2 of the second cooling pipe 172 and the third level h3 of the third cooling pipe 173 may be equal to each other.

The first cooling pipe 171 and the second cooling pipe 172 or the first cooling pipe 171 and the third cooling pipe 173 may be connected to each other through a branch unit (not illustrated). For example, the first cooling pipe 171 and the second cooling pipe 172 may be connected to each other through a front branch unit 150. More particularly, an external connection pipe 190 may be connected to the front branch 150 together with the first and second cooling pipes 171 and 172. A cooling medium flowing in from the external connection pipe 190 may be distributed to the first and second cooling pipes 171 and 172 through the front branch unit 150, and conversely, a cooling medium from the first and second cooling pipes 171 and 172 may be collected in the front branch unit 150 and flow out to the external connection pipe 190. As for the flow of a cooling medium, a low-temperature cooling medium flowed in through the external connection pipe 190 and the front branch unit 150 may be branched into the first and second cooling pipes 171 and 172 to perform heat exchange respectively with the first and second groups of battery packs (not illustrated), and a cooling medium heated to a high temperature through the heat exchange may be collected into the front branch unit 150 and then flow out through the external connection pipe 190 connected to the front branch unit 150.

As will be described below, the cooling medium flowing through the first cooling pipe 171 may be branched into the third cooling pipe 173 through a rear branch unit 160. That is, a portion of the cooling medium flowed into the first cooling pipe 171 through the front branch unit 150 may dissipate the heat of the first group of battery packs and then return to the front branch unit 150 via a bypass flow path 171B, and another portion of the cooling medium flowed into the first cooling pipe 171 may flow into the third cooling pipe 173 through the rear branch unit 160.

The front branch unit 150 may be formed at a front position in the entire battery module and the rear branch unit 160 may be formed at a rear position in the entire battery module. For reference, although a reference numeral 150' in FIG. 2 and a reference numeral 150 in FIG. 6 both refer to a front branch unit, since only a portion (bottom portion) of the front branch unit is illustrated in FIG. 2, different reference numerals are assigned thereto. Similarly, although a reference numeral 160' in FIG. 2 and a reference numeral 160 in FIG. 6 both refer to a rear branch unit, since only a portion (bottom portion) of the rear branch unit is illustrated in FIG. 2, different reference numerals are assigned thereto.

The first cooling pipe 171 and the third cooling pipe 173 may be connected to each other through the rear branch unit 160. The cooling medium of the first cooling pipe 171 may flow into the third cooling pipe 173 through the rear branch unit 160, dissipate the heat of the third group of battery packs, and then return to the first cooling pipe 171 through the rear branch unit 160. For example, a portion of the cooling medium flowing through the first cooling pipe 171 may dissipate only the heat of the first group of battery packs and then bypass through the bypass flow path 171B without passing through the rear branch unit 160, and another portion of the cooling medium flowing through the first cooling pipe 171 may dissipate the heat of the first group of battery packs and then dissipate the heat of the third group of battery packs through the rear branch unit 160. As such, the bypass flow path 171B and a flow path 171A passing through the rear branch unit 160 may be formed in parallel along the flow path of the first cooling pipe 171, and the bypass flow path 171B and the flow path 171A of the rear branch unit 160 may be separated from each other from the front branch unit 150 forming a start point and an end point along the circulation path of the first cooling pipe 171.

By forming the bypass flow path 171B along the flow path of the first cooling pipe 171, the heat of the first group of battery packs including the greatest number of battery packs may be efficiently dissipated. For example, the cooling medium flowing through the bypass flow path 171B may maintain a rather low temperature and may efficiently cool the first group of battery packs even in the process of returning to the front branch unit 150.

The first to third groups of battery packs may be distributedly arranged on the first to third cooling plates 121, 122, and 123 arranged at different positions. The first to third cooling pipes 171, 172, and 173 may be formed with different diameters in order to uniformly dissipate the heat of the first to third groups of battery packs distributedly arranged at a plurality of positions.

The first cooling pipe 171 may be formed with the largest diameter because it dissipates the heat of the first group of battery packs including the greatest number of battery packs. For example, the first cooling pipe 171 may be formed with a diameter of 11 mm. Also, the second cooling pipe 172 may be arranged at a position adjacent to the external connection pipe 190 with a relatively high pressure while dissipating the heat of the second group of battery packs including the smallest number of battery packs. For this reason, the second cooling pipe 172 may be formed with the smallest diameter in order to restrict the cooling flow to the second cooling pipe 172.

More particularly, the first cooling pipe 171 may include, along the flow path thereof, the flow path 171A passing through the rear branch unit 160 and the bypass flow path 171B bypassing the rear branch unit 160. In this case, the longest flow path 171A connected to the third cooling pipe 173 through the rear branch unit 160, that is, the longest flow path 171A connected from the first cooling pipe 171 to the third cooling pipe 173, may be formed with the largest diameter, for example, a diameter of 11 mm, in order to supply a relatively large flow. Also, the bypass flow path 171B bypassing the rear branch unit 160 along the flow path of the first cooling pipe 171 may be formed with a relatively small diameter, for example, a diameter of 9 mm, in comparison with the flow path 171A of the rear branch unit 160 in order to restrict the flow rate of a cooling medium. That is, since the bypass flow path 171B of the first cooling pipe 171 may be formed with a smaller diameter than the flow path 171A of the rear branch unit 160, it may be designed to allocate a larger flow to the flow path 171A of the rear branch unit 160 connected from the first cooling pipe 171 to the third cooling pipe 173 to have a relatively large demand for heat dissipation. Particularly, since the diameter of the flow path 171A (among the flow path of the first cooling pipe 171) connected to the third cooling pipe 173 arranged at the longest distance from the external connection pipe 190 may be formed to be relatively large, the pressure drop and the flow resistance may be reduced along the flow of the cooling medium and thus a suitable flow rate thereof may be secured.

The second cooling pipe 172 may be arranged at a position adjacent to the external connection pipe 190 with a relatively high pressure while dissipating the heat of the second group of battery packs including the smallest number of battery packs. For this reason, the second cooling pipe 172 may be formed with the smallest diameter in order to restrict the cooling flow to the second cooling pipe 172. For example, the second cooling pipe 172 may be formed with a diameter of 6 mm.

An upper portion of the first cooling plate 121 with the first cooling pipe 171 embedded therein may have a flat shape, and a lower portion thereof may have a shape protruding convexly along the shape of the first cooling pipe 171. Since this structure may stably support the first group of battery packs through a flat upper surface of the first cooling plate 121 and form a sufficient thermal contact with the first group of battery packs and a lower surface of the first cooling plate 121 may be formed in a shape protruding convexly along the outer circumference of the first cooling pipe 171, the first cooling pipe 171 may be sufficiently embedded therein and a portion without the first cooling pipe 171 formed therein may be formed with a small thickness and thus the material cost thereof and the weight of the entire battery module may be reduced. For example, a lower portion of the first cooling pipe 171 may be formed to surround the first cooling pipe 171 along the shape of a mold (not illustrated) in the process of forming the first cooling plate 121.

Each of the first to third cooling pipes 171, 172, and 173 may include a plurality of pipes. For example, the first to third cooling pipes 171, 172, and 173 may include a plurality of pipes extending in parallel to each other in order to uniformly transmit the cooling medium over the entire area of the first to third cooling plates 121, 122, and 123 in order to achieve a uniform heat dissipation effect over the entire area of the first to third cooling plates 121, 122, and 123 supporting the battery packs. Also, the first to third cooling pipes 171, 172, and 173 may include a plurality of pipes in order to form a circulation flow path including an inflow path from the external connection pipe 190 and an outflow path toward the external connection pipe 190. In this case, a fixing block 180 may be formed between adjacent pipes extending in parallel to each other in order to form the first to third cooling pipes 171, 172, and 173.

The fixing block 180 may bind adjacent pipes into one bundle, maintain a certain distance therebetween, and support the pipes with respect to each other. Particularly, the fixing block 180 may function as a jig for maintaining a certain position of the first to third cooling pipes 171, 172, and 173 against the flow of a molten metal, in the process of forming the first to third cooling plates 121, 122, and 123 with the first to third cooling pipes 171, 172, and 173 integrally formed therein, More particularly, the first to third cooling pipes 171, 172, and 173 may need to be temporarily fixed in a mold (not illustrated) for forming the first to third cooling plates 121, 122, and 123, and the first to third cooling plates 121, 122, and 123 with the first to third cooling pipes 171, 172, and 173 integrally formed therein may be formed by injecting a molten metal into the mold with the first to third cooling pipes 171, 172, and 173 temporarily fixed therein. In this case, in order to maintain a plurality of pipes of the first to third cooling pipes 171, 172, and 173 at a certain position against the pressure of a molten metal injected at a high pressure, the fixing block 180 may connect the plurality of pipes and maintain them at a normal position.

For example, in a mold (not illustrated) for forming the first to third cooling plates 121, 122, and 123, by accommodating a plurality of pipes bound by the fixing block 180 and pressing an upper portion of the fixing block 180 through a fixing jig (not illustrated), the fixing block 180 may be fixed in position and the plurality of pipes may be fixed through the fixing block 180 so as not to flow in the mold (not illustrated). That is, since the fixing block 180 may fix a plurality of pipes for forming the first to third cooling pipes 171, 172, and 173 with respect to each other and simultaneously an external fixing jig (not illustrated) may provide a pressure point for providing a certain pressure, the first to third cooling pipes 171, 172, and 173 may be formed at uniform depths in the first to third cooling plates 121, 122, and 123 and may be fixed in position so as not to protrude outside. In this case, since the fixing block 180 may provide a pressure point of a fixing jig (not illustrated) and maintain contact with the fixing jig (not illustrated) even in the process of injecting a molten metal, the fixing block 180 may be exposed to any one of the upper surface and the lower surface in the completed first to third cooling plates 121, 122, and 123.

The fixing block 180 may be buried in the molten metal and embedded in the first to third cooling plates 121, 122, and 123. The fixing block 180 may be formed of the same metal material as the first to third cooling plates 121, 122, and 123. For example, the fixing block 180 may be formed of the same aluminum material as the first to third cooling plates 121, 122, and 123. That is, the fixing block 180 may be buried in an aluminum molten metal for forming the first to third cooling plates 121, 122, and 123 and may form a gapless coupling (i.e., a defectless coupling such as a crackless coupling) with the first to third cooling plates 121, 122, and 123 in the process of cooling and hardening thereof. For example, the fixing block 180 and the first to third cooling plates 121, 122, and 123 formed of the same material to have the same material characteristics may closely contact each other to form a solid coupling with each other in the process of cooling and hardening thereof.

The fixing block 180 may include an upper unit 181 and a lower unit 182 coupled to face each other with the first cooling pipe 171 therebetween and a coupling unit 183 formed to couple the upper unit 181 and the lower unit 182 together.

Hereinafter, a water leakage blocking structure of the front branch unit 150 and the rear branch unit 160 will be described. Here, the water leakage blocking of the front branch unit 150 and the rear branch unit 160 may mean preventing the leaked water of the front and rear branch units 150 and 160 from penetrating into the battery packs. The front branch unit 150 may be a portion where the first and second cooling pipes 171 and 172 and the external connection pipe 190 are connected to each other, and the risk of a water leakage therein may be relatively high. Also, the rear branch unit 160 may be a portion where the first and third cooling pipes 171 and 173 are connected to each other, and the risk of a water leakage therein may be relatively high.

The front branch unit 150 may include a first lower branch block 151 formed at the first level h1, a first upper branch block 152 formed at the second level h2, and a first connection unit 153 connecting the first lower branch block 151 and the first upper branch block 152 to each other. In this case, the first lower branch block 151 and the first upper branch block 152 may be embedded in the first and second cooling plates 121 and 122 respectively. That is, the first lower branch block 151 may be embedded in the first cooling plate 121 together with the first cooling pipe 171, and the first upper branch block 152 may be embedded in the second cooling plate 122 together with the second cooling pipe 172. In this case, the first lower branch block 151 and the first upper branch block 152 may be embedded in the first and second cooling plates 121 and 122 and completely surrounded by the first and second cooling plates 121 and 122, and therefore, the water leakage of the first lower branch block 151 and the first upper branch block 152 may be prevented and the leaked water may be blocked from penetrating into the battery packs.

Meanwhile, in an embodiment, the rear branch unit 160 may include a second lower branch block 161 formed at the first level h1, a second upper branch block 162 formed at the third level h3, and a second connection unit 163 connecting the second lower branch block 161 and the second upper branch block 162 to each other. In this case, the second lower branch block 161 and the second upper branch block 162 may be embedded in the first and third cooling plates 121 and 123 respectively. That is, the second lower branch block 161 may be embedded in the first cooling plate 121 together with the first cooling pipe 171, and the second upper branch block 162 may be embedded in the third cooling plate 123 together with the third cooling pipe 173. In this case, the second lower branch block 161 and the second upper branch block 162 may be embedded in the first and third cooling plates 121 and 123 and completely surrounded by the first and third cooling plates 121 and 123, and therefore, the water leakage of the second lower branch block 161 and the second upper branch block 162 may be prevented and the leaked water may be blocked from penetrating into the battery packs.

Like the first connection unit 153, the second connection unit 163 may include a second lower connection pipe 163A, a second connection member (not illustrated), and a second upper connection pipe 163B. In this case, since the second lower connection pipe 163A, the second connection member, and the second upper connection pipe 163B may be formed in the same or similar way as a first lower connection pipe (not illustrated), a first connection member (not illustrated), and a first upper connection pipe (not illustrated) to be described below, redundant descriptions thereof will be omitted for conciseness.

In another embodiment, the rear branch unit 160 may include a second lower branch block 161, a second connection unit 163, and a second upper branch block 162. In this case, since the second lower branch block 161 and the second upper branch block 162 may be the same as or similar to those described above, redundant descriptions thereof will be omitted for conciseness.

The second connection unit 163 may include a double sealing structure. The second connection unit 163 may include a second lower connection pipe 163A connected from the first cooling pipe 171, a second upper connection pipe 163B connected from the third cooling pipe 173, and a second connection block 163C connecting the second lower connection pipe 163A and the second upper connection pipe 163B. In this case, the second connection block 163C may fluidly couple the second lower connection pipe 163A and the second upper connection pipe 163B while covering the outer circumferences thereof, and a sealing member (not illustrated) may be interposed between the inner circumference of the second connection block 163C and the outer circumferences of the second lower connection pipe 163A and the second upper connection pipe 163B. More particularly, two sealing members may be superimposed between the inner circumference of the second connection block 163C and the outer circumference of the second lower connection pipe 163A to provide a double sealing structure applied thereto. Likewise, two sealing members may be superimposed between the inner circumference of the second connection block 163C and the outer circumference of the second upper connection pipe 163B to provide a double sealing structure applied thereto. The sealing member may be formed of an elastic material surrounding the outer circumferences of the second lower connection pipe 163A and the second upper connection pipe 163B, and may be formed of a rubber material such as an O-ring.

Hereinafter, for convenience of description, the rear branch unit 160 will be described in detail with reference to a case where the second connection unit 163 is formed as a double sealing structure.

The external connection pipe 190, the first cooling pipe 171, and the first connection unit 153 may be connected to the first lower branch block 151 of the front branch unit 150, and in this case, a brazing coupling may be applied between the first lower branch block 151 and the external connection pipe 190, between the first lower branch block 151 and the first cooling pipe 171, and between the first lower branch block 151 and the first connection unit 153. A brazing coupling may also be similarly applied to the first lower branch block 151 of the front branch unit 150. In the first lower branch block 151 and the first upper branch block 152 to which a plurality of pipes are connected, since a brazing coupling may be applied between the plurality of pipes and the first lower branch block 151 and the first upper branch block 152, the water leakage between the plurality of pipes and the first lower branch block 151 and the first upper branch block 152 may be prevented.

A leakless fluid connection may be formed at the front branch unit 150 through a brazing coupling, and a leakless fluid connection may be formed at the rear branch unit 160 by using a double sealing structure. In this case, unlike an integral coupling such as brazing, even when a double sealing structure is applied to the rear branch unit 160, there may be a possibility of water leakage according to the pressure of the cooling medium. For example, for the assembly of the entire battery module, the first cooling plate 121 (or the first cooling pipe 171) and the third cooling plate 123 (or the third cooling pipe 173) may be detachably connected on the side of the rear branch unit 160. In this case, even when a double sealing structure is applied for airtight connection, the water leakage possibility may be higher than that of an integral coupling such as a brazing coupling.

For this reason, a drain hole (not illustrated) may be formed around the rear branch unit 160. For example, the drain hole may be formed at the first cooling plate 121 under the rear branch unit 160. Even when water leaks around the rear branch unit 160, more particularly, around the second connection block 163C of the rear branch unit 160, it may be discharged outside through the drain hole of the first cooling plate 121 and may be prevented from penetrating into the battery packs. For example, the drain hole may be formed as a through hole passing through the first cooling plate 121.

Hereinafter, the first connection unit 153 will be described in detail.

Figure 9:
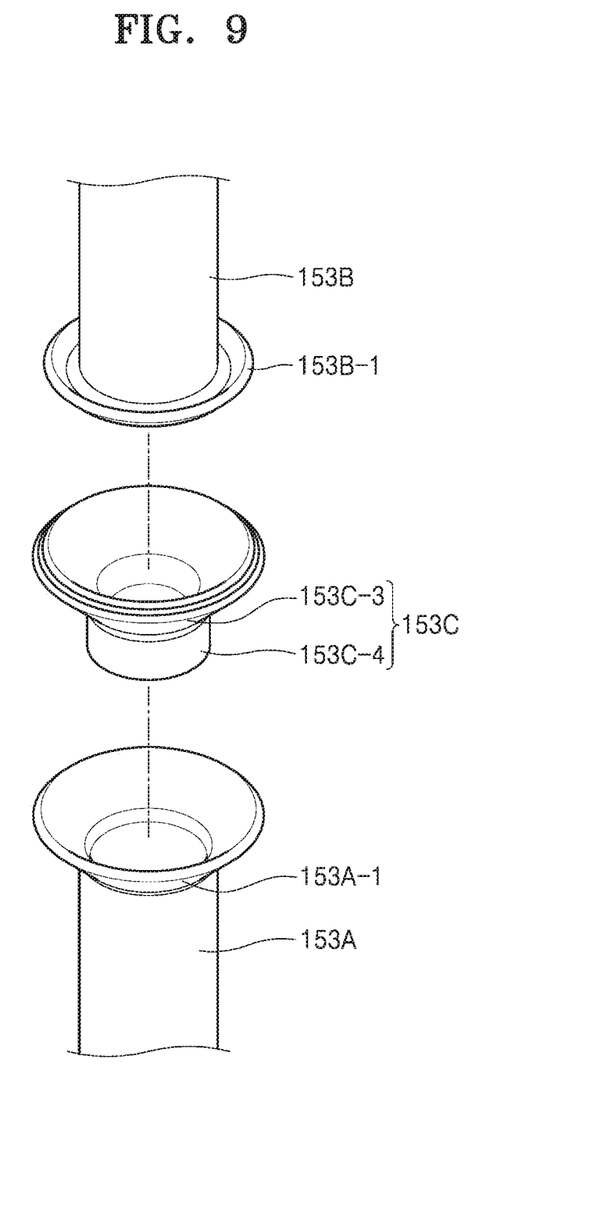
FIG. 9 is an exploded perspective view illustrating a coupling relationship of a first connection member illustrated in FIG. 6.
Figure 10:
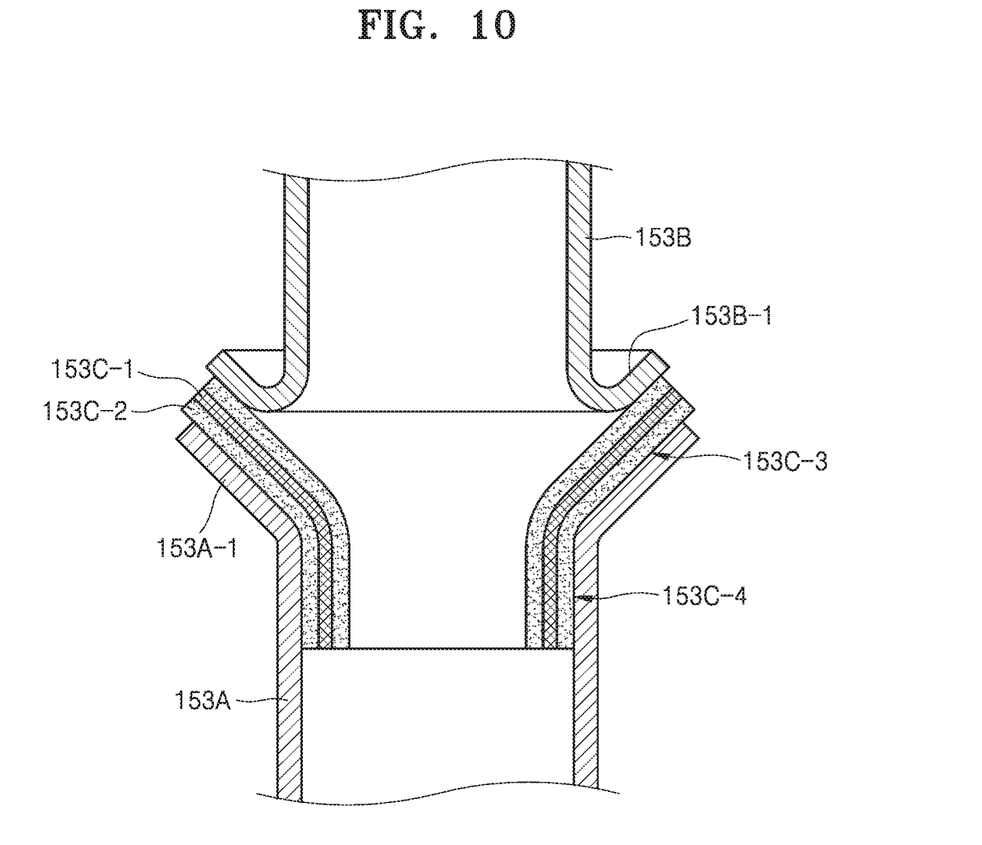
FIG. 10 is a cross-sectional view illustrating a coupling relationship of the first connection member illustrated in FIG. 9.

FIG. 9 is an exploded perspective view illustrating a coupling relationship of a first connection unit illustrated in FIG. 6. FIG. 10 is a cross-sectional view illustrating a coupling relationship of the first connection unit illustrated in FIG. 9.

Referring to FIGS. 9 and 10, the first connection unit 153 may include a first lower connection pipe 153A, a first upper connection pipe 153B, and a first connection member 153C.

The first lower connection pipe 153A may be connected to a first cooling pipe (not illustrated) and an external connection pipe (not illustrated). In this case, the first lower connection pipe 153A may be connected to the first cooling pipe and the external connection pipe through a first lower branch block (not illustrated). One end of the first lower connection pipe 153A may be formed to be inclined. In this case, the first lower connection pipe 153A may include a first lower connection unit 153A-1 formed to be inclined. The first lower connection unit 153A-1 may be bent to extend radially in the lengthwise direction of the first lower connection pipe 153A from the outer surface of the first lower connection pipe 153A to the outer circumferential direction of the first lower connection pipe 153A. In this case, the inner diameter of the first lower connection unit 153A-1 may increase in the lengthwise direction of the first lower connection pipe 153A. That is, the first lower connection unit 153A-1 may be inclined to be away from the outer surface of the first lower connection pipe 153A as it is away from the first cooling pipe.

Also, the first upper connection pipe 153B may be connected to the first lower connection pipe 153A and a second cooling pipe (not illustrated) through the first connection member 153C. In this case, the first upper connection pipe 153B may be connected to the second cooling pipe through a first upper branch block (not illustrated). One end of the first upper connection pipe 153B may be formed to be bent. In this case, the bent end of the first upper connection pipe 153B may form a first upper connection unit 153B-1. The first upper connection 153B-1 may be bent from the first upper connection pipe 153B such that the inner surface of the first upper connection pipe 153B is exposed outside. For example, the first upper connection unit 153B-1 may be bent from the outer surface of the first upper connection pipe 153B toward the second cooling pipe 172. In this case, the first upper connection unit 153B-1 may be formed to be inclined to correspond to the first lower connection unit 153A-1.

The shapes of the first lower connection unit 153A-1 and the first upper connection unit 153B-1 may vary according to the arrangement of the first lower connection unit 153A-1 and the first upper connection unit 153B-1. For example, when the first lower connection unit 153A-1 is arranged in the first upper connection unit 153B-1, the first lower connection unit 153A-1 may have the same shape as the first upper connection unit 153B-1 described above and the first upper connection unit 153B-1 may have the same shape as the first lower connection unit 153A-1 described above. On the other hand, in another embodiment, when the first upper connection unit 153B-1 is arranged in the first lower connection unit 153A-1, the first lower connection unit 153A-1 and the first upper connection unit 153B-1 may have the same shapes as those described above. Hereinafter, for convenience of description, a detailed description will be given with reference to a case where the first upper connection unit 153B-1 is arranged in the first lower connection unit 153A-1.

The first connection member 153C may be arranged between the first lower connection pipe 153A and the first upper connection pipe 153B to connect the first lower connection pipe 153A and the first upper connection pipe 153B. In this case, the first connection member 153C may be arranged between the first lower connection pipe 153A and the first upper connection pipe 153B.

The first connection member 153C may include a first core member 153C-1 and a first shell member 153C-2. In this case, the first core member 153C-1 and the first shell member 153C-2 may be formed with different hardnesses. For example, the first core member 153C-1 may be formed of a metal material, and the first shell member 153C-2 may be formed of an elastic material such as silicone or rubber. In this case, the first shell member 153C-2 may be modified when the first connection member 153C, the first lower connection pipe 153A, or the first upper connection pipe 153B is installed, thereby improving the assembly thereof. The first shell member 153C-2 may be arranged to completely cover the first core member 153C-1.

The first connection member 153C may include a first sealing unit 153C-3 arranged between the first lower connection unit 153A-1 and the first upper connection unit 153B-1, and a first body unit 153C-4 connected to the first sealing unit 153C-1 and inserted into at least one of the first lower connection pipe 153A and the first upper connection pipe 153B. The first sealing unit 153C-3 may have a shape corresponding to the first lower connection unit 153A-1. For example, the first sealing unit 153C-3 may be formed in a funnel shape. The first body unit 153C-4 may be arranged in the first lower connection pipe 153A. In this case, the first sealing unit 153C-3 and the first body unit 153C-4 may form a "Y" character.

The first connection member 153C may be manufactured in various forms. For example, the first connection member 153C may be manufactured by forming the first core member 153C-1 and then insert-injecting the first core member 153C-1 into the first shell member 153C-2. In another embodiment, a mold may be used to apply the first core member 153C-1 to the first shell member 153C-2. Particularly, when a mold is used, a mold fitting line of an upper mold and a lower mold coupled to each other may be formed at a portion of the first connection member 153C where the first connection member 153C and the first lower connection unit 153A-1 and the first connection member 153C and the first upper connection unit 153B-1 do not contact each other. That is, the mold fitting line may be formed at an edge portion of the first connection member 153C. In this case, the first lower connection unit 153A-1 and the first connection member 153C and the first upper connection unit 153B-1 and the first connection unit 153C may completely contact each other.

In the case of assembling the first connection unit 153, the first connection member 153C may be inserted into the first lower connection pipe 153A. In this case, the first shell member 153C-2 may completely contact the inner surfaces of the first lower connection pipe 153A and the first lower connection unit 153A-1.

The first upper connection pipe 153B may be inserted into the first connection member 153C. In this case, the first upper connection pipe 153B may contact the inner surface of the first connection member 153C. In this case, the first upper connection unit 153B-1 may completely contact the inner surface of the first connection member 153C. Particularly, in this case, the first upper connection unit 153B-1 may be coupled to the first connection member 153C in a forced fitting manner.

When the first lower connection pipe 153A, the first connection member 153C, and the first upper connection pipe 153B are coupled to each other as described above, the first upper connection unit 153B-1 may move toward the first connection member 153C and the first lower connection unit 153A-1. That is, the first upper connection unit 153B-1 may be closer to the outer surface of the first upper connection pipe 153B than the initial position while being inserted into the first connection member 153C. In this case, a restoration force may be generated at the first upper connection unit 153B-1, and due to the restoration force, the first upper connection unit 153B-1 may press the first connection member 153C toward the first lower connection unit 153A-1. In this case, the first connection member 153C arranged between the first upper connection unit 153B-1 and the first lower connection unit 153A-1 may completely contact the first upper connection unit 153B-1 and the first lower connection unit 153A-1, thereby improving the airtightness between the first upper connection unit 153B-1 and the first lower connection unit 153A-1.

Thus, in the battery module, the first cooling pipe and the second cooling pipe may be connected through a simple structure through the first connection member 1530. Also, the battery module may prevent a water leakage that may occur after the connection of the first cooling pipe and the second cooling pipe through the first connection member 153C, thereby increasing the life of the battery module and improving the stability thereof.

The battery module may be easily assembled because at least one of the first cooling pipe and the second cooling pipe and the first cooling pipe and the third cooling pipe may be connected without a separate structure. Also, in the battery module, since at least one of the first cooling pipe and the second cooling pipe and the first cooling pipe and the third cooling pipe may be assembled through the connection unit, at least one of the first cooling pipe and the second cooling pipe and the first cooling pipe and the third cooling pipe may be completely sealed and connected to each other.

Although the present disclosure has been described with reference to the above embodiments, various changes or modifications may be made therein without departing from the spirit and scope of the present disclosure. Thus, the appended claims will include all such changes or modifications falling within the spirit and scope of the present disclosure.

INDUSTRIAL APPLICABILITY

According to an embodiment of the present disclosure, by providing battery modules that may be easily assembled and may prevent water leakage, embodiments of the present disclosure may be applied to electric vehicles, ships, electric bicycles, or the like using battery packs or the like.

The invention claimed is:

1. A battery module comprising:
a first cooling pipe;
a second cooling pipe connected to the first cooling pipe and arranged on a different plane than the first cooling pipe;
a third cooling pipe connected to the first cooling pipe and arranged on a different plane than the first cooling pipe; and
a branch unit connected between at least one selected from the group consisting of: the first cooling pipe and the second cooling pipe, and the first cooling pipe and the third cooling pipe,
wherein the branch unit includes:
a lower connection pipe connected to the first cooling pipe and including a lower connection unit;
an upper connection pipe connected to the second cooling pipe or the third cooling pipe and including an upper connection unit; and
a connection member into which one of the lower connection pipe and the upper connection pipe is inserted and which is inserted into the other one of the lower connection pipe and the upper connection pipe, the connection member being between the lower connection unit and the upper connection unit and contacting the lower connection unit and the upper connection unit,
wherein the lower connection unit of the lower connection pipe connected to the upper connection pipe is inclined along a lengthwise direction of the lower connection pipe, and the upper connection unit of the upper connection pipe connected to the lower connection pipe is inclined along a lengthwise direction of the upper connection pipe,
wherein the lower connection unit or the upper connection unit is forcibly fitted into the connection member, and
wherein the lower connection unit or the upper connection unit is shaped so that the lower connection pipe or the upper connection pipe, respectively, has:
an inner surface comprising an inner surface portion exposed to an outside of the lower connection pipe or the upper connection pipe; and
an outer surface opposite to the inner surface and comprising an outer surface portion, opposite to the inner surface portion, that faces the lower connection pipe or the upper connection pipe.

2. The battery module of claim 1, further comprising a third cooling plate where the third cooling pipe is arranged.

* * * * *